United States Patent [19]

McGraw

[11] Patent Number: 4,893,846
[45] Date of Patent: Jan. 16, 1990

[54] CONNECTOR FITTINGS

[76] Inventor: Doonan D. McGraw, 245 Saint James Way, Naples, Fla. 33942-6715

[21] Appl. No.: 346,473

[22] Filed: May 2, 1989

[51] Int. Cl.$^4$ ............................................. F16L 21/06
[52] U.S. Cl. ..................... 285/156; 285/177; 285/179; 285/322; 285/369; 285/383; 285/901
[58] Field of Search ............... 285/322, 356, 250, 393, 285/323, 901, 156

[56] References Cited

U.S. PATENT DOCUMENTS

| | | | |
|---|---|---|---|
| 1,370,289 | 3/1921 | Crippen | 285/250 |
| 1,606,188 | 11/1926 | Selah | 285/323 |
| 1,814,481 | 7/1931 | Metcalf Jr. et al. | 285/393 X |
| 2,755,110 | 7/1956 | Jacobs | 285/322 X |
| 2,761,702 | 9/1956 | Noel | 285/323 |
| 3,552,781 | 1/1971 | Helland | 285/356 X |
| 4,335,908 | 6/1982 | Burge | 285/250 |
| 4,653,781 | 3/1987 | Sheets et al. | 285/323 X |
| 4,805,932 | 2/1989 | Imhof et al. | 285/322 X |

FOREIGN PATENT DOCUMENTS

| | | | |
|---|---|---|---|
| 7429 | of 1904 | United Kingdom | 285/322 |
| 631 | of 1905 | United Kingdom | 285/322 |

Primary Examiner—Thomas F. Callaghan

[57] ABSTRACT

Fittings for cylindrical members such as pipes, tubes, and rods. A nut main body has internal camming surfaces formed by threads on a bore or recess inner surface, and a cap bolt has a through bore, and a longitudinally segmented shank defining clamping legs. External camming surfaces defined by threads on the remote ends of the clamping legs from the bolt head fit within the internal camming surfaces with the bolt head engaging the nut main body so that the internal and external camming surfaces are contained within the nut main body and protected against damage. A cylindrical member fits through the cap bolt bore and into the nut main body recess axially beyond the internal camming surfaces. Further tightening of the cap bolt causes camming action of the camming surfaces to occur, forcing the clamping legs to bend in cantilever fashion so that their remote ends clampingly grip the cylindrical member. Suitable seals are provided to keep the camming surfaces protected. Stop means in the nut main body may locate the cylindrical member end. The fitting may be axially extending or angularly formed, may clamp cylindrical members at both nut main body ends to join two such members together, or may have a pipe thread at one end opposite one cap bolt. Modifications may include tees, elbows, and X-shaped main-bodies. Differently sized cylindrical members may be joined. In all arrangements the camming surfaces are so contained as to be protected against physical damage and contamination during handling, transport, and in use.

24 Claims, 2 Drawing Sheets

CONNECTOR FITTINGS

FIELD OF THE INVENTION

The invention relates to connector fittings for one or more cylindrical members, which may be pipes, tubes, rods, or other type members. Fittings embodying the invention may connect a cylindrical member to another body of a different type, or may connect two or more cylindrical members together. Such connections may be a coaxial arrangement, an angular arrangement, or any combination of such arrangements. When such connections are made for pipes, tubes or rods, arrangements in addition to the straight in-line or coaxial arrangement include tees, elbows, U-connections, X-connections, and the like.

A connector fitting embodying the invention comprises a nut or main body and a cap bolt for each cylindrical member to be connected by the fitting. A particular type of fitting clamping arrangement is used, which is sometimes referred to as a cantilever clamping action fitting. The type fitting employed is a quick connect and quick disconnect fitting which seals any fluid in any tube or pipe with which it is employed against pressure loss.

BACKGROUND OF THE INVENTION

Numerous tube or pipe couplings or fittings are known in the art, some of them which have quick connect and quick disconnect features. Examples are found in any patents, some typical ones being those noted here. U.S. Pat. No. 4,124,235 -Grahl et al., issued in November, 1978, is typical of a threaded body and nut arrangement having a wedge-like metal sleeve which is tightened in gripping relation with a tube extending therethrough as the nut is threaded on the external threads of the body. U.S. Pat. No. 1,615,233 to Redlinger, issued in January, 1927, is typical of some cantilever clamping action fittings using tapered threads to cause the Cantilever clamps to engage the pipe or other cylindrical member being gripped. U.S. Pat. No. 4,544,186 to Proni, issued in October of 1985, shows a similar clamp action fitting in which a fitting body has split ends provided with external threads. An internally threaded nut is threaded over the split ends. When the nut is threaded on the split ends until it bottoms out on a flange on the fitting body, the threads force the main body split ends into clamping engagement with a tube or pipe. U.S. Pat. No. 3,499,671 to Osborne, issued in March of 1970, shows another coupling for a tube without using flared ends, and includes a deformable metal sleeve between a nut and body having threaded engagement with each other.

It is typical of such prior art when threads or other camming surfaces are used that the threads or camming surfaces are exposed to contaminants or physical damage during handling and transport, as well as while being used as a coupling or connector. Others are not preassembled, and then attached to cylindrical members in clamping fashion without some disassembly or with only a minimum of securing action. Some do not provide adequate sealing arrangements to handle higher fluid pressures in the tubes or pipes which are connected by them.

SUMMARY OF THE INVENTION

A nut main body has internal camming surfaces formed by threads on a bore or recess inner surface. A cap bolt has a through bore, a bolt head, and a longitudinally segmented shank defining axially extending clamping legs. External camming surfaces, defined by threads on the ends of the clamping legs which are remote from the bolt head, fit within the internal camming surfaces of the nut main body with the bolt head engaging the nut main body so that the internal and external camming surfaces are contained within the nut main body and protected against physical damage during transport and handling. A cylindrical member, which may be a pipe, tube, rod or other device, fits through the cap bolt bore in snug but relatively movable relation, and extends at least into the nut main body recess axially beyond the internal camming surfaces. It is preferred that the nut main body have a passage or bore of which the recess having the internal camming surfaces are a part, with the cylindrical member extending at least partially into the nut main body passage or bore axially inward of the recess internal camming surfaces. The cap bolt is then further tightened, but cannot move axially further into the recess because of the engagement of the bolt head and the end of the nut main body. This causes camming action of the camming surfaces to occur, creating forces acting radially inward on the clamping legs at their ends with the external camming surfaces formed thereon, causing them to be resiliently bent in cantilever fashion to clampingly grip the cylindrical member. It is preferred that suitable seals be provided to keep the camming surfaces further protected, and to hold fluid pressures which may later be introduced into the pipe, tube or other fluid-conducting cylindrical member. It is also preferred that stop means be provided in the nut main body to locate the end of a cylindrical member at the appropriate position in the nut main body. Such stop means may be one or more shoulders positioned for abutting relation with the end of cylindrical members, or a removable C-clip in an internal groove in the passage or bore of the nut main body, or the end of another cylindrical member already positioned and clamped in place in the nut main body. The last noted stop means is particularly effective when two cylindrical members of different outer diameters are being connected by a fitting embodying the invention, with the larger one of the cylindrical member ends acting as an abutting stop for the smaller one, the larger one having been previously located by a shoulder in the nut main body passage or bore.

Fittings embodying the invention herein disclosed and claimed may be axially extending or angularly formed, may clamp cylindrical members at two nut main body ends to join two such members together, or may have a pipe thread at one end opposite one cap bolt so that the fitting is secured to a tank or other fluid-containing device with a pipe or tube being connected to the tank interior by the fitting. Other modifications may include tees, elbows, and X-shaped nut main bodies. Different size cylindrical members may be joined by a single fitting. In all arrangements the camming surfaces are so contained as to be protected against physical damage during handling, transport, installation and use. It is also preferred that those surfaces be so protected against contaminants by the use of shipping seals until they are ready to be installed, and then by the cylindrical member or members as seals after installation and during use.

DETAILED DESCRIPTION

Figure 1:
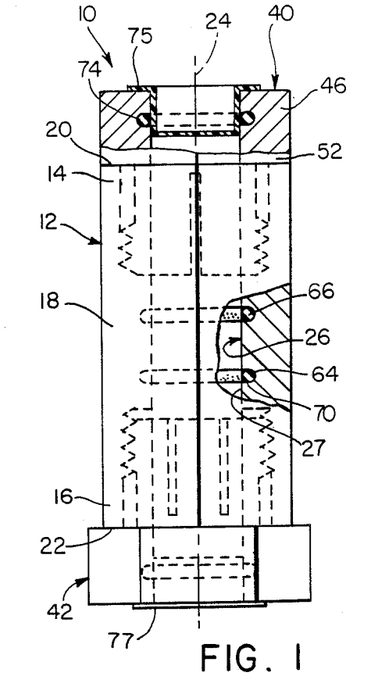
FIG. 1 is an elevation view of a fitting showing one embodiment of the invention, with parts broken away and in section. The fitting is illustrated in its transport condition, with shipping seals or caps in place.
Figure 2:
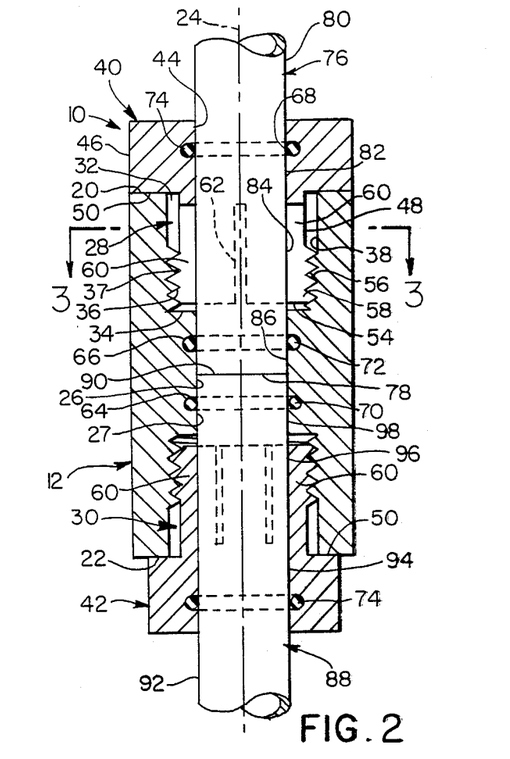
FIG. 2 is a cross section view of the fitting of FIG. 1, taken in the direction of arrows 2—2 of FIG. 3 and showing a pair of cylindrical members installed, with the fitting in clamping and sealing relation with the cylindrical members.
Figures 3, 4:
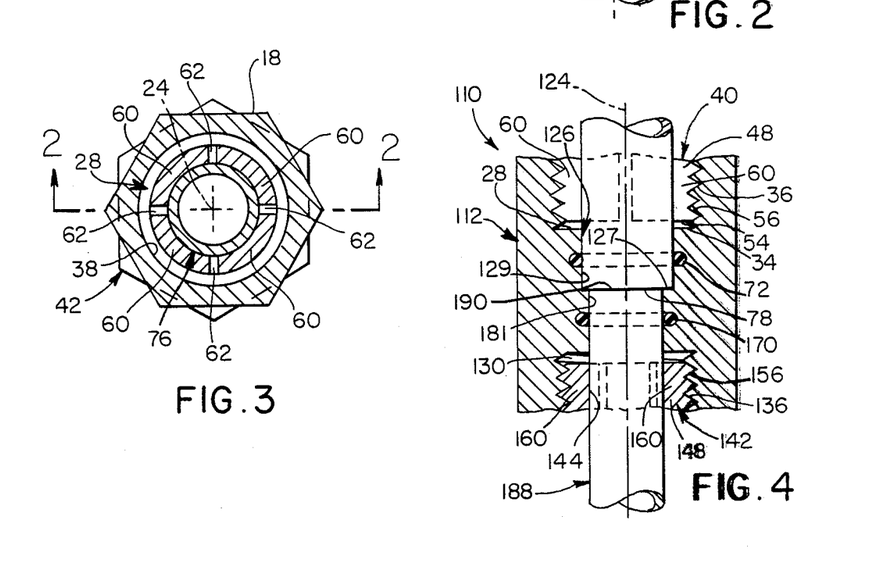
FIG. 3 is a cross section view taken in the direction of arrows 3—3 of FIG. 2.
FIG. 4 is a cross section view with parts broken away. It is similar to that of FIG. 2 and shows another embodiment of the invention wherein two cylindrical members having different outer diameters are clamped together by the fitting in sealed relation.

The fitting 10 of FIGS. 1, 2 and 3 is of the type in which either one cylindrical member or two cylindrical members are received and clamped by the fitting. In FIG. 1, the fitting is shown in its transport condition, as will be further described. Fitting 10 has a nut 12 forming the fitting main body. The exterior of the nut is defined by opposed ends 14 and 16 and an outer side wall 18 shown as being hexagonal to provide a good tool purchase for installation and removal of the cylindrical members. Ends 14 and 16 respectively have end outer surfaces 20 and 22. These surfaces are illustrated as being perpendicular to the fitting axis 24, but are not required to be so. For example, they may be somewhat conical, in either a convex or concave manner. Such variations are more fully disclosed and claimed elsewhere, and are therefore not further shown or described here.

Bore 26 is better illustrated in FIG. 2. It has an axially central portion 27 of a diameter commensurate with the outer diameter of the cylindrical members to be received therein, preferably such that there is a snug fit but that the cylindrical members can still be moved axially and turned arcuately in the bore so long as they are not yet clamped in place. One outer end of bore 26 is provided with a recess 28 and the other bore outer end is provided with a recess 30. These recesses are larger in diameter than the diameter of the axially center portion 27 of the bore. Since these recesses are identical but oppositely disposed, only recess 28 will be described in further detail, it being understood that recess 30 is identically constructed.

Recess 28 has its outer end 32 opening through nut main body end surface 20 and its inner end terminating at the recess bottom 34. Internal camming surface 36, defined by an internal thread 37, is formed on about the axially inner half of recess 28. Cross section segments of internal thread 37, as seen in FIG. 2, are generally triangular so that the camming surface 36 is a spiral surface located on the lower side of the thread 37. Camming surface 36 extends upwardly from the recess bottom 34, or from a point immediately adjacent thereto, and also extends inwardly from the side wall 38 of the recess. The camming surface 36, when seen in cross section as shown in FIG. 2, is therefore oblique to the axis 24. While the other side of the thread 37 is a similar but reverse angled surface, it functions primarily only as a thread surface for the usual threading action to be described.

The axially outer half of the recess side wall 38 is not threaded, and has a diameter at least as large as the root diameter of the thread 37 forming the internal camming surface 36 so that a mating external thread, when inserted in that part of the side wall 38, may axially pass by it without requiring any threading action. This decreases preassembly time. The internal camming surface 36 is not needed or desired in this area because the camming action should occur near the recess bottom 34 rather than near the recess outer end 32. This provides a longer moment arm for the most effective cantilever action and clamping force with a given force exerted.

Fitting 10 also has cap bolts 40 and 42 at the opposite ends 14 and 16 of nut main body 12. These cap bolts are also structurally comparable, and usually even dimensionally identical, to each other, and therefore only cap bolt 40 will be described in greater detail. It is to be understood that cap bolt 42 bears the same relationship to nut main body end surface 22 and to recess 30 as does cap bolt 40 to nut main body end surface 20 and recess 28. As later noted, it and recess 30 may at times be of a different size from cap bolt 40 and recess 28.

Cap bolt 40 has a bore 44 extending therethrough, with bore 44 being coaxial with the fitting axis 24 when assembled to and within nut main body 12. In the particular fitting illustrated, bore 44 is also preferably of the same diameter as the axially central portion 27 of bore 26. Cap bolt 40 includes a bolt head 46 and a bolt shank 48 extending axially from one of the axially spaced side surfaces 50 of bolt head 46. Bolt head 46 has a laterally positioned side exterior surface 52 also shaped for good tool purchase, and is here illustrated as being hexagonal and of the same size as the hexagonal exterior side surface 18 of the nut main body 12. As shown in FIG. 2, the bolt head surface 50 is in surface mating engagement with the nut main body end surface 20 when the cap bolt is in its installed position for fitting transport and in use.

Cap bolt shank 48 is annular since bore 44 also passes axially through it. The shank end 54 remote from bolt head 46 terminates so that it is of a somewhat shorter axial length than the axial length of recess 28 from nut main body surface 20 to recess bottom 34. External camming surface 56 is formed by an external thread 58 on shank 48 so that it extends from the shank remote end 54 axially toward bolt head surface 50, but preferably terminates at about the same distance from surface 50 that camming surface 36 terminates relative to the nut main body outer end 20. The remaining axial portion of shank 48 from the termination of thread 58 to the cap bolt head surface 50 is preferably of about the same diameter as the root diameter of thread 58. As described to this point, shank 48 is essentially an externally threaded annular extension from the bolt head 46. However, it is divided into several longitudinally extending segments 60 by slots 62. These slots extend from the shank outer end 54 through the camming surface 56 and also through most of the shank length, stopping immediately adjacent to, yet preferably spaced from, bolt head surface 50. Shank segments 60 may therefore be identified as cantilever shank legs. In the illustrated construction, there are four slots 62 and therefore four shank segments or legs 60. Some other applications or fitting constructions may use ore or less shank legs. If less are used, the slots 62 are then considerably wider arcuately so that the shank legs are sufficiently arcuately narrow to still function as resilient cantilevers. This would lessen the maximum obtainable clamping action, and should not be used where high clamping forces are required. It is more likely that more shank legs will be preferred. When the cylindrical member to be clamped is rather large, like in drain pipes, water mains, sewer pipes, etc., there may be more slots and shank legs to maximize the effective clamping areas of the shank legs and still obtain the needed cantilever action. When used with a drain pipe that is one meter in outer diameter, for example, and therefore with an outer circumference of 3.14 meters, it would be appropriate to use as much as fifty to one hundred shank legs on one cap bolt to assure sufficient cantilever flexibility commensurate with a large total clamping area of engagement.

Since the cross section view of the cap bolt 40 in FIG. 2 is taken along a line or in a plane passing through two oppositely positioned slots 62, the two shank legs of cap bolt 40 are not in section, but are shown in elevation. To more fully illustrate this, the cross section of the cap bolt 42 is shown as passing through the shank at other than the slot locations so that the shank legs of that cap bolt are shown in cross section. The cap bolt 42 is illustrated as being one-twelfth turn from having the hexagonal side surfaces of its bolt head in surface alignment with the hexagonal side surfaces of the nut main body 12 in order to show this. In the installed position, the hexagonal side surfaces in actual practice may or may not be in surface alignment unless very precise tolerances are maintained in making the nut main body, the cap bolts, and the cylindrical members. The expense to accomplish this is not normally justified.

Internal grooves 64 and 66 are preferably provided in the axial central portion 27 of bore 26, and internal groove 68 is preferably provided in bore 44 near the axially central portion of bolt head 46. Seals, here shown as O-rings 70, 72 and 74, are respectively received in grooves 64, 66, and 68 to provide added sealing relative to the cylindrical members once those members are inserted and in position to be clamped. With surfaces 20 and 50 engaged, and effectively in sealing relation even though not a high pressure seal, and seals 70, 72, and 74 sealing against the cylindrical members as well as the nut main body and cap bolt, the camming surfaces 36 and 56 are well protected against contaminants. By use of shipping caps 75 and 77 in the outer ends of the cap bolt bore 44, contaminants are kept out of the recesses and therefore away from the camming surfaces during handling and transport. These shipping caps are preferably removed only immediately prior to insertion of the cylindrical member or members to be clamped. Therefore at various times the camming surfaces are substantially always protected against contaminants by sealing means, which at times include the sealing caps 75 and 77 and, at other times, instead include the cylindrical member or members being clamped. The sealing means may, but necessarily does not, include the seals 74, 74 in cap bolts 40 and 42, or seals 70 or 72. As noted elsewhere, these seals are not necessary when the cylindrical member or members are rods or do not conduct fluid under pressure.

The fitting 10 is normally preassembled to the extent shown in FIG. 1, with cap bolts 40 and 42 threaded in place so that their bolt heads are in light forcible surface engagement with the nut main body end surfaces. Those surface engagements, together with the shipping caps 75 and 77 in position as shown, fully protect the camming surfaces 36 and 56, and their associated threads 37 and 58, as well as the walls of the bore sections, free of contamination by dust and dirt, etc., and against physical damage due to external forces accidentally being exerted on them.

Occasionally, a fitting 10 is to be secured to only one cylindrical member. Usually the one cylindrical member is then inserted entirely through the fitting so that it extends axially beyond both of the cap bolts 40 and 42. If it is a solid cylindrical member, or one which is not required to conduct fluid without leakage, it may terminate within the axially central portion 27 of bore 26 or therebeyond. If the fitting is to provide a tubular dead end closure of a pipe or tube cylindrical member, it should terminate after it has been inserted past one or both of seals 72 and 70, but not into recess 30. Then, a solid or dummy cap bolt is threaded in place instead of cap bolt 42, with a seal such as an 0-ring seal being placed between the shank end of the solid cap bolt and the bottom of recess 30, if pressure sealing is needed. The solid cap bolt and the seal effectively plug and seal the end of the nut main body opposite cap bolt 40.

The more common use of the fitting 10 is in the connection of two pipes or tubes, as shown in FIG. 2. One tube or pipe 76 is inserted through the cap bolt bore 44 and recess 28 until its tube end 78 passes axially beyond seal 72. At this position, the tube outer surface 80 has one surface section 82 within bolt head 46 so that it is in sealing engagement with seal 74, another surface section 84 within the portion of the shank legs 60 having the camming surface 36 thereon, and another surface section 86 within the axially central bore portion 27 so that it is in sealing engagement with seal 72. The second tube or pipe 88 is inserted through the cap bolt bore of the cap bolt 42 and recess 30 until its tube end 90 passes axially beyond seal 70. If tube 76 has already been clamped in position, as would be the usual case, its tube end 78 will act as a stop engaged by the tube end 90 of tube 88, effectively axially locating that tube in position. At this position of tube 88, the tube outer surface 92 has one surface section 94 within the head of cap bolt 42 so that it is in sealing engagement with the seal 74 of that cap bolt, another surface section 96 within the portion of the shank legs of cap bolt 42 having its camming surface thereon, and another surface section 98 within the axially central bore portion 27 so that it is in sealing engagement with seal 70. Tube 88 is then also clamped in position, as will be described. All of the fitting camming surfaces and bore surfaces are then once again sealed, with the tubes 76 and 88 sealing the bores and recesses in place of the shipping caps used during transport and handling.

When tube 76 is inserted into its proper axial position as above described, and also in its desired rotational position if there is a concern in that regard, it is the usual practice to then clamp it in place without delay. This is accomplished by rotating the cap bolt 40 in a direction tending to thread it further into the nut main body 12. The hexagonal outer surfaces of the bolt head 46 and the nut main body 12 aid in this operation, providing good tool purchases for tools such as wrenches. Because the cap bolt 40 is already threaded into the nut main body 12 until surfaces 20 and 50 are in engagement, the cap bolt cannot actually moved axially further into the nut main body bore 26 by such action. Instead, the camming surface 36 of the shank legs will move arcuately relative to the camming surface 56 of recess 28, causing tensile forces to be exerted along the shank legs 60. Camming action results, with a force vector which moves the outer ends of the shank legs 60 in a resilient cantilever action inwardly, causing the inner surfaces of the shank legs in the axial area of the camming surface 36 to grip and clamp the tube outer surface section 84.

It has been found, with a typical National Course thread defining the camming surfaces, that only about one-tenth of a turn of the cap bolt 40 is usually required to obtain full clamping action which will hold a one-half inch tube in place against axial removal and in proper sealing relation under pressures normally encountered. The amount of arcuate turning required will vary to some extent due to any variations in the difference in the radius of the cylindrical member and the radius of the cap bolt bore, since that difference determines the distance that each of the shank leg ends must move radially inward to clamp the cylindrical member. Other factors affecting this are the pitch of the threads forming the camming surfaces and the fit of the camming surfaces to each other before clamping action is initiated.

Pressures in various hydraulic pressure systems such as those used in air conditioning systems, fuel lines, oil lines, water lines, gas lines, sewer lines, vacuum lines, and other conduits may be readily accommodated. There are numerous applications in plant equipment and machinery and other plant or building installations. Fittings embodying the invention may be used in these applications as well as others ranging from engine cooling and exhaust systems to medical equipment, for example.

They may be made of various materials, depending on the required pressures, the possible chemical reactions between the fluids being conducted and the material of the fittings, and the material of which the cylindrical members are made so that there are no adverse reactions or galvanic action, by way of example. The environment in which the fittings and cylindrical members are to be used must also be considered. A corrosive atmosphere or fluid being conducted, or immersion in a hostile environment such as salt water would require materials designed for such use. Fittings embodying the invention may be used to assemble rods forming parts of toys, tent supports, playground equipment or scaffolding, for example. They are particularly useful in equipment requiring repeated assembly and disassembly in normal use, such as scaffolding, since they are quickly clamped in place and are as quickly released to minimize disassembly time. Fittings used in this manner may be readily reused. That is also the case in many other applications.

When conduits for conducting high temperature fluids are to be connected, such as in some power plant conduits, seals other than rubber-like O-ring seals may be used. Seals which will withstand temperatures that the rubber-like materials will not are well known in the seal art.

The fittings are also adapted to being made of injection-molded plastic such as nylon for use with small plastic tubes, or of PVC for use with PVC piping that is now so common in household water and sewer systems. In many instances they may be machined from bar stock, using appropriate metals and alloys such as brass, aluminum, bronze, and stainless steel. In other instances the nut main body may be cast of appropriate metal and machined as needed.

FIG. 4 shows a modification of the fitting of FIGS. 1-3 in which two cylindrical members of different diameters are to be connected. Where appropriate, the same reference numerals apply to the same fitting elements, with different reference numerals being used for modified or new elements.

The fitting 110 has a nut main body 112 provided with a stepped bore 126 having a bore axis 124. The upper portion of the fitting 110 as seen in FIG. 4 is the same as the upper portion of fitting 10 of FIG. 2, until it reaches the midpoint of the axially central bore portion 27 of FIG. 2. Therefore it has the same recess 28 and cap bolt 40, with the same camming surfaces 36 and 56, the same shank legs 60, etc. The modification begins with the shoulder 127 located axially about at the midpoint between seal 72 and a seal 170. Seal 170 is comparable to seal 70 of FIG. 2, but is of smaller diameter for reasons discussed below. Thus the axially central portion of bore 126 includes an upper bore section 129 and a lower bore section 131 separated by the shoulder 127. The upper bore section 129 is illustrated as being of the same diameter as the axially central bore section 27 of FIG. 2, and therefore tube 76 or some other cylindrical member fits into the upper half of the fitting 110 in the same manner that it does in fitting 10. In the FIG. 4 modification, however, the tube end 78 is inserted in bore 126 until it seats against shoulder 127. It is in sealing engagement with seals 72 and 74 as before, and is clamped in position by cap bolt 40, and particularly its shank legs 60, as before.

The lower bore section 131 is of smaller diameter than the upper bore section 129, to accommodate a smaller outer diameter tube (or other cylindrical member) 188. Otherwise, the lower portion of the fitting 110 is similar in construction and arrangement to the lower portion of the fitting 10. Of course, the cap bolt 142 has a smaller diameter shank 148, including shank legs 160, and the recess 130 is also of somewhat smaller diameter, as are the camming surfaces 136 and 156. Tube 188 is still snugly received in the smaller diameter cap bolt bore 144, and its tube end 190 is inserted to the point where shoulder 127 is located.

In instances where the outer diameter of tube 188 is greater than the inner diameter of tube 76, tube end 190 will seat against the tube end 78, providing a stop for tube 188 in a manner similar to the stop for tube end 78 provided by shoulder 127.

If the outer diameter of tube 188 is less than the inner diameter of tube 76, tube end 190 is inserted until the tube is axially past seal 170 at the least, and may be inserted even into the end 78 of tube 76. Care is taken to insert it at least to the desired extent, with some leeway as to the exact amount of insertion. This has the added advantage that the combined lengths of tubes 76 and 188 may be telescopically adjusted over a wider range than permitted if the tube ends abut each other as shown in FIGS. 2 and 4. Of course, if more axial leeway is required, the fittings 10 and 110 can be made with greater axial spacing between the locations of seals 70 and 72 of FIG. 1 or seals 170 and 72 of FIG. 2. The tube ends do not have to be abutting for sealing purposes, since seals 70 and 72 or 170 and 72 separately seal their associated tubes rather than the abutment of the tube ends being the seal.

Figure 5:
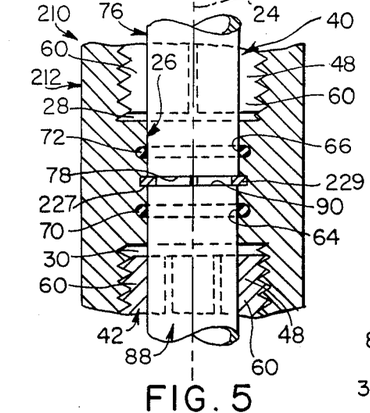
FIG. 5 is another cross section view with parts broken away. It is similar to that of FIGS. 2 and 4 and shows still another embodiment of the invention.

FIG. 5 shows another modification of the fitting 10 of FIG. 2. In this instance the fitting 210 uses the same bores 40 and 44, recesses 28 and 30, cap bolts 40 and 42, camming surfaces 36 and 56, tubes 76 and 88, and seals 70, 72 and 74 and their details as shown in FIG. 2. The modification includes the addition of a groove 227 in the axially central bore portion 27, the groove 227 being axially intermediate seal grooves 64 and 66 containing seals 70 and 72. A suitable removable tube stop 229 is mounted in groove 227, and is shown as being a C-clip. This clip is a resilient clip which may be of the split ring or split washer type, or a modification thereof in which the clip ends have holes therein to receive a clip compression tool for clip insertion and removal. Such clip constructions are well known in the art.

In this modification, tubes 76 and 88 are each inserted in their respective bores and bore sections until their respective tube ends 78 and 90 abut the stop 229, thus easily axially locating the tubes. The cap bolts are tightened as with the structure of FIG. 2, and the shank legs 60 clamp the tubes in place.

Figure 6:
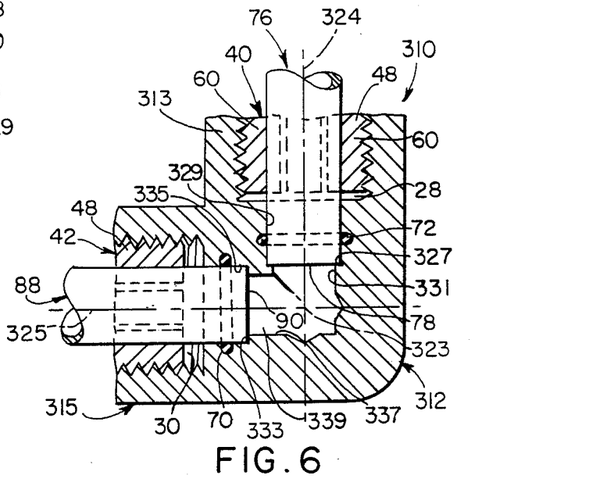
FIG. 6 is another cross section view with parts broken away. It is similar to that of FIGS. 2, 4 and 5 and shows an elbow version of the fitting embodying the invention.

FIG. 6 shows another modification of fitting 10. In this modification, the nut main body 312 of fitting 310 is made in the form of an elbow rather than along a single axis. This is a good example of a nut main body which is cast and machined, or is injection molded when made of suitable plastic. Nut main body 312 has one portion 313 shown as extending upwardly in FIG. 6, and another portion 315 extending laterally. While it is shown as extending about 90° between the axis 324 of nut main body portion 313 and the axis 325 of nut main body portion 315, it is understood that it can be at other acute or obtuse angles as needed. Typical other angles would be 45° and 135°, providing fittings with oblique angles.

At times, certain ultimate user requirements may require custom angles. These can be provided, even to the extent that a U-shaped fitting can be made with a third bore having its axis intersecting the then-parallel bore section axes 324 and 325 similar to the intersection 323 of axes 324 and 325 shown in FIG. 6. This third bore would have its open end plugged if it were formed as a recess, or both open ends plugged if it is formed as a through bore. If cast, it can sometimes be cast in place without requiring such plugs. In such an arrangement, nut main body portions 313 and 315 would be spaced sufficiently far apart, at a minimum, to permit the tightening and loosening of the cap bolts 40 and 42 respectively fitted therein. Occasionally, the bores having axes 324 and 325 may even be located in different planes so that the axes are skew. The construction would be much like the U-shaped fitting, but the axes 324 and 325 would not be parallel to each other. Both axes would still intersect the axis of the third bore.

In the modification shown in FIG. 6, a shoulder 327 is formed axially between the bore sections 329 and 331, similar to shoulder 127 of FIG. 4 which is formed axially between bore sections 129 and 131. The bore section 331 is of slightly smaller diameter than bore section 329, preferably by no more than twice the wall thickness of tube 76 at tube end 78 so that the bore section 331 is no smaller than the inner diameter of tube 76 at tube end 78. By making the diameter of bore section 331 the same as the inner diameter of tube 76 at tube end 78, turbulent flow is lessened with consequent minimum pressure loss due to such flow.

Another shoulder 333 is formed axially between the bore sections 335 and 337 of bore 339, and is similar to shoulder 327. Tube 88 is illustrated as being inserted through the cap bolt 42 and recess 30 and then into bore section 335 until the tube end 90 abuts shoulder 333. The cap bolts are tightened and the tubes are clamped in position as before. Of course, one of the tubes 76 and 88 may be larger than the other, following the teaching of the arrangement of FIG. 4.

Figure 7:
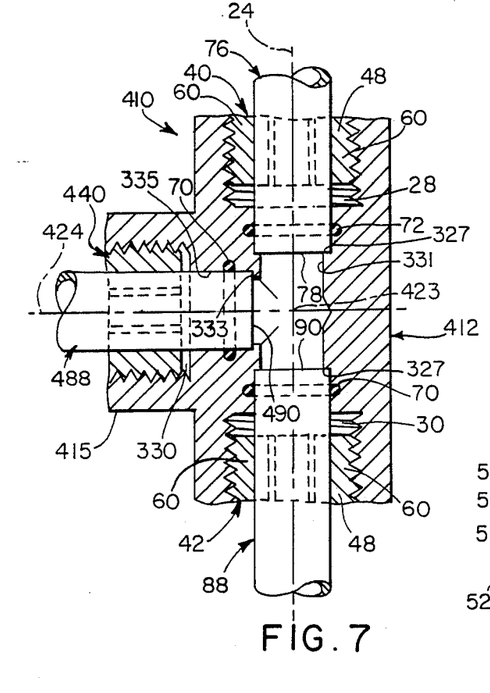
FIG. 7 is another cross section view with parts broken away. It is similar to that of FIG. 6 and shows a tee version of the fitting embodying the invention.

FIG. 7 shows still another modification of the fitting embodying the invention. In this arrangement the fitting 410 is formed as a tee, and is a combination of the arrangements of FIGS. 2 and 6, with greater axial space between the seals 70 and 72 to accommodate the side connection constructed like the main body portion 315 of FIG. 6. The nut main body 412 therefore has bore axis 24 extending through cap bolts 40 and 42 as before, and the main body side portion 415 has its bore axis 424 intersecting bore axis 24 at 423. Main body side portion 415 is constructed in a similar manner to main body portion 315 of FIG. 6, and receives tube 488 therein in the same manner that main body portion 315 receives tube 88. Tube end 490 of tube 488 abuts shoulder 333, and the tube interiors are all in fluid communication in the bore areas where axes intersection 423 occurs. The cap bolts 40, 42 and 440 are tightened to respectively clamp tubes 76, 88 and 488 in like manner as before. By prearrangement of the fitting dimensions, one or two of the tubes may have different diameters from the third tube, following the teaching in FIG. 4, rather than all being of the same outer diameter.

Figure 8:
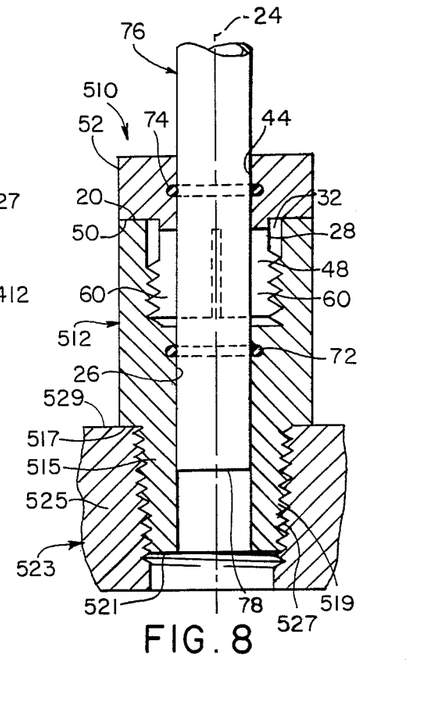
FIG. 8 is another cross section view with parts broken away. It is similar to that of FIG. 2, and shows a fitting embodying the invention with one cylindrical member clamped by the fitting and the fitting main body having a pipe thread connection to a container such as a tank, the interior of which the tubular cylindrical member is connected for fluid transmission.

FIG. 8 shows another modification of the fitting 10 of FIG. 2. In this modification the upper half of the fitting 510 is the same as the upper half of fitting 10, down to the axial location beyond seal 72 from recess 28 and cap bolt 40. There is no groove 64 and seal 70 in bore 26, however, since only one tube 76 is being connected by fitting 510. The lower main body portion 515 of nut main body 512 is provided with a shoulder 517 on the outer surface thereof, and an external pipe thread 519 extends from shoulder 517 to the lower end 521 of the nut main body 512. Bore 26 extends through the lower main body portion and opens through the nut main body lower end 521.

A container 523 for a fluid to be present in tube 76 and the lower part of bore 26 has a wall 525 in which a mating internal pipe thread 527 is formed so that fitting 510 can be threaded therein and secured to the container. Although not shown, a suitable seal may be provided between shoulder 517 and the container wall outer surface 529 if needed to prevent any fluid leakage past the pipe threads. Container 523 may be a tank, a larger pipe or other conduit, a bottle, etc. In this arrangement, the fitting 510 is usually secured in place to the container by the pipe threads and the tube 76 is then inserted through the cap bolt bore 40 and the nut main body bore 26, including recess 28, until the tube end 78 is positioned axially beyond seal 72 but usually does not extend beyond nut main body end 521. If the tube 76 is a pick-up tube for fuel in a fuel tank, for example, it may extend well into the fuel tank in accordance with fuel pick-up design. The cap bolt is tightened as before, and the tube 76 is clamped in position.

In all of the fitting modifications herein disclosed, the camming surfaces and the internal bore or bores are protected with shipping caps during transport and handling, and continue to be protected by the sealing arrangements between the tube or tubes and the seals or bore walls where the tube or tubes fit snugly, as well as the surface fit between the cap bolt heads and the nut main body end surfaces. It is of particular importance and advantage that the camming surfaces are so protected at substantially all times from the time that the fitting is preassembled through the period of its installation and use in its installed condition.

I claim:

1. A fitting of the spring cantilever clamp action type having spring cantilever clamping legs and a plurality of normally engaged camming surfaces, said spring cantilever clamping legs being resiliently moved to the cantilever clamping position from an unclamped normal position by the cooperative camming action of said plurality of engaged camming surfaces acting in one direction and by cantilever spring action returning to the unclamped normal position when the cooperative camming action of said camming surfaces acting in said one direction is reversed, said camming surfaces being positioned obliquely relative to said clamping legs and also obliquely relative to the direction of resilient movement of said clamping legs to and from the clamping position;

said fitting being constructed and arranged to have said camming surfaces internally contained so as to be protected against accidental impact damage during normal handling, transport, the process of attachment to at least one cylindrical member, and in its installed position;

said fitting comprising:

a nut defining a fitting main body and having a plurality of ends, said nut further having a bore therein defining at one bore end an enlarged recess opening outwardly of said bore through one of said nut ends, said recess being provided with a first one of said camming surfaces defined by an internal thread in axially inwardly spaced relation to the outward opening of said recess;

a cap bolt having a bore therethrough, a bolt head, a longitudinally segmented annular bolt shank extending axially from said bolt head and provided with a second one of said camming surfaces defined by an interrupted external thread at the remote end of said segmented annular bolt shank from said bolt head, said second camming surface being in axially spaced relation to said bolt head so that said segmented annular bolt shank is fully received in said nut recess when said cap bolt is threaded into said nut until said bolt head engages said nut one end at said recess outer opening to prevent further movement of said bolt head axially toward said recess and to fully contain said internal and said external thread camming surfaces protectively within said recess, said segmented annular bolt shank comprising shank segments defining said spring cantilever clamping legs;

and means sealing said cap bolt bore in the area of said cap bolt head and also sealing said nut recess axially beyond said internal camming surface thread;

said internal and external camming threads cooperating in camming relation to move said shank segment clamping legs in cantilever fashion inwardly when said cap bolt is rotated in a further inwardly threading direction, said shank segment clamping legs then being adapted to clampingly grip a member received in said bore in the axial area of said external thread camming surface.

2. The fitting of claim 1 in which said sealing means comprises removable shipping caps in the opening of said cap bolt bore through said bolt head and in said nut bore on the axially opposite side of said recess from said cap bolt during normal handling and transport of the fitting.

3. The fitting of claim 1 in which said sealing means comprises a member inserted through said cap bolt bore and into said nut bore at least through said recess axially beyond the axial area of said internal thread camming surface, said member being the member being clampingly gripped by said fitting when said shank segment clamping legs are moved inwardly by further tightening of said cap bolt and the consequent camming action of said internal and external thread camming surfaces.

4. The fitting of claim 1, said fitting further having a first seal in said cap nut bore in the axial area of said bolt head and a second seal in said nut bore on the axially opposite side of said recess from said cap bolt, said first and second seals being adapted to sealingly engage a cylindrical member to be inserted through said cap bolt bore and said recess and at least into said nut bore axially past said second seal and to then be clamped by said clamping legs as set forth.

5. The fitting of claim 1 wherein said nut bore comprises a first portion defined by claim 1 and an additional second portion connecting with said first portion and continuing through said nut to said nut other end, said nut bore second portion having a second recess and a third camming surface defined by a second internal thread positioned in axially inwardly spaced relation to the axially outward opening of said second recess, and another cap bolt constructed like said first defined cap bolt, said another cap bolt fitting into said second recess in like manner to said first defined cap bolt fitting into said first defined recess, said sealing means sealing said another cap bolt bore and in so doing operatively sealing said nut first and second recesses, said internal and external camming threads of said nut second recess and said another cap bolt likewise cooperating in camming relation to move said another cap bolt shank segment clamping legs in cantilever fashion inwardly when said another cap bolt is rotated in a further inwardly threading direction, said another cap bolt shank segment clamping legs then being adapted to clampingly grip a member received in said nut bore in the axial area of said another cap bolt external thread camming surface.

6. The fitting of claim 5 in which said nut bore has stop means located axially intermediate said first and second recesses for limiting the axial inward position of a member to be clampingly gripped by said first named cap bolt shank segment clamping legs and for operatively limiting the axially inward position of a member to be clampingly gripped by said another cap bolt shank segment clamping legs.

7. The fitting of claim 6, said stop means being a C-clip removably positioned in an internal groove formed in the side wall of said nut bore.

8. The fitting of claim 6, said stop means being at least one shoulder formed by a decreased diameter portion of the side wall of said nut bore.

9. The fitting of claim 5, said nut bore first and second portions being in coaxial alignment.

10. The fitting of claim 5, said nut bore first and second portions being in angular axial relation so that said nut defines a fitting main body for connecting two cylindrical members at an angle other than 180 degrees.

11. The fitting of claim 1 in which said nut bore extends through said nut and opens through the other of said nut ends, the part of said nut adjacent to said other nut end having external pipe threads formed thereon so that said fitting may be threaded into a pipe-threaded recess in a fitting support member having an internal chamber and said nut bore is thus adapted to be in fluid connection with such a fitting support member internal chamber.

12. The fitting of claim 11 in which the part of said nut adjacent to said other nut end having external pipe threads formed thereon is in angular axial relation to the part of said nut receiving said cap bolt therein.

13. A connective fitting comprising: a nut body having
- a stepped bore extending therethrough for receiving therein a member to which said fitting is adapted to be connected and having an inner surface of a diameter commensurate with the outer diameter of the member adapted to be received therein;
- at least one end of said bore defining an axially extending recess opening outwardly of said nut body and having a larger diameter than the diameter of the adjacent inner portion of said bore;
- said recess having an inner portion provided with internal threads which in cross section have angular sides extending angularly to a transverse plane perpendicular to the axis of said recess, a recess bottom adjacent said internal threads, and an outer portion having an inner surface which has a diameter substantially equal to the base diameter of said internal threads;
- and an annular end surface at the outward opening of said recess;
- at least one cap bolt having a head portion and a shank portion extending from said head portion, said cap bolt further having,
- a bolt bore extending therethrough for receiving the member therethrough to which said fitting is adapted to be connected, said bolt bore having an inner surface of a diameter commensurate with the outer diameter of the member adapted to be received therethrough;
- said cap bolt head portion having an annular surface formed about said shank portion and in matable engagement with said nut body annular end surface, and further having an outer surface providing a tool grippable surface;
- said shank portion extending axially from said head portion and having:
- an axially remote end portion provided with external threads matable in threaded relation with said internal threads of said nut body,
- an unthreaded outer diameter part thereof adjacent to said head portion and positioned axially intermediate said head portion and said threaded axially remote end portion,
- said remote end portion having an end surface so axially spaced from said head portion annular surface that said shank portion is axially shorter than the axial extent of said nut body recess between said nut body annular end surface and said nut body recess bottom,
- and a plurality of slots formed therethrough from said remote end portion end surface through and beyond said shank portion remote end portion and into at least the majority of the axial extent of said shank portion unthreaded outer diameter part to define a plurality of circumferentially spaced shank legs;
- said cap bolt shank portion being threaded into said recess until said nut body annular end surface is in mating engagement with said cap bolt head portion annular surface and adapted to be threadedly tightened after the receipt of the member to be connected with said fitting into said nut body bore through said cap bolt bore, to exert tensile forces in said shank legs and by thread camming action move said shank legs into gripping engagement with the outer surface of the member to be connected with said fitting;
- said internal and external threads being at all times protected inside said nut body bore while said cap bolt external threads are in threaded relation with said nut body internal threads.

14. A connective fitting comprising:
- an axially extending nut body having an outer end surface and provided with an axially extending stepped bore having an axially inward inner diameter portion and an outer end opening through said end surface of said nut body, said bore outer end being an enlarged diameter outer end in relation to said axially inward inner diameter portion and being provided with generally triangular cross section internal threads extending radially inwardly from the bore surface of said bore enlarged diameter outer end and extending axially from the bottom of said bore enlarged diameter outer end to no more than half the axial distance from said bottom to the opening of said bore through said nut body outer end surface;
- an axially extending cap bolt provided with a bore therethrough in axially aligned relation with said nut body bore, said cap bolt having a head and a shank extending axially from said head, said shank being axially slotted to form a plurality of shank legs extending from said head, said shank legs having generally triangular cross section external threads formed thereon on the ends thereof remote from said head axially toward said head for at least an axial part of the axial lengths of said shank legs, said external threads normally in assembled position threadedly mating with said nut body internal threads and, together with said internal threads, being protectively received within said nut body bore enlarged diameter end, said cap bolt head having an annular surface in mating relation with said nut body outer end surface;
- said connective fitting being adapted to receive a member, to which it is to be connected, through said cap bolt bore and at least into said nut body bore axially inward inner diameter portion in snug fitting but movable relation after which said cap bolt is threaded further into said nut body about the member to exert axial tensile forces through said shank legs and generate thread camming actions which create force vectors moving said shank legs threaded ends radially inward to grip the member in secure retaining relation, keeping said internal and said external threads protectively sealed within said nut body bore enlarged diameter outer end.

15. The invention of claim 14 in which sealing means are provided within said nut body bore axially inward inner diameter portion for sealing cooperation with the member to be connected and to provide a pressure seal.

16. The invention of claim 15 further having other sealing means within the part of said cap bolt bore which is within said head, said other sealing means being adapted to sealingly engage the member to be connected and provide a seal relative thereto, said nut body outer end surface and said cap bolt head mating annular surface operatively providing a seal between said nut body and said cap bolt.

17. A connective clamp fitting for connection with a cylindrically formed member, said fitting comprising a main body defined by an internally threaded nut having a longitudinal axis and a cap bolt also having a longitudinal axis aligned therewith, said cap bolt further having an externally threaded shank threaded into said nut, said main body comprising:

a bore extending into said main body along said nut longitudinal axis and having an enlarged diameter outer portion opening through one end of said nut, said nut one end having an annular surface formed about said opening, said bore enlarged diameter outer portion having internal threads formed therein in axially spaced relation to said nut one end and a smooth bore inner surface axially between said threads and said nut one end;

said cap bolt having a head and a bore extending through said head and said shank along said cap bolt axis, said shank being a reduced diameter portion of said cap bolt extending from said head to the shank outer end and having external threads formed on a portion thereof extending from said shank outer end only to a point axially spaced from said head, said shank having slots extending from its outer end through and beyond said external threads and terminating adjacent said head, said slots dividing said shank into a plurality of shank legs, said head having an annular surface which cooperates with said nut one end annular surface in surface engaging relation when said cap bolt is fully threaded into said nut to limit further axial threading movement of said cap bolt into said nut, with further thread-tightening movement of said cap bolt relative to said nut causing said external threads on said shank legs to be cammed inwardly toward said axes by said internal threads, resiliently moving said shank legs in a bending inward direction and being therefore adapted to establish a gripping and securing relation with a cylindrical member when a cylindrical member is snugly but axially movably received in said bores in radial alignment with said shank threaded portion, said internal and external threads then being sealed against contaminants by said engaged annular surfaces and by the fit of the cylindrical member relative to said cap bolt and said nut.

18. A fitting of the cantilever clamp action type in which the cantilever clamping action is obtained by cooperative internal and external cam threads, the fitting being constructed and arranged to have said threads protected against contaminants and accidental impact damage during normal handling, transport, attachment to at least one cylindrical member, and in its installed position, said fitting comprising:

a nut defining a fitting main body and having a recess therein provided with internal threads in axially inwardly spaced relation to the opening of said recess;

a cap bolt having a bore therethrough, a head, a longitudinally segmented shank extending axially from said head and provided with external threads at the outer end thereof in axially spaced relation to said head so that said shank is fully received in said nut recess when said cap bolt is threaded into said nut until said head engages said nut at the recess opening to prevent further movement of said cap bolt head axially toward said recess and fully contain said internal and said external threads protectively within said recess; and means sealing said cap bolt bore in the area of said head and sealing said nut recess axially beyond said internal threads;

said threads cooperating in camming relation to move said shank segments in cantilever fashion inwardly when said cap bolt is rotated in a further inwardly threading direction and to thread-lockingly resist cap bolt rotation in the outwardly threading direction, said shank segments then being adapted to grip a member received in said bore in the axial area of said external threads.

19. The fitting of claim 18 in which said sealing means comprises removable shipping caps in said cap bolt bore and said recess during normal handling and transport of the fitting.

20. The fitting of claim 18 in which said sealing means comprises a member inserted through said bore and into said recess at least axially beyond the axial area of said internal threads, said member being the member being gripped by said fitting when said shank segments are moved inwardly by further tightening of said cap bolt and the consequent camming action of said internal and external threads.

21. A fitting of the spring cantilever clamp action type having spring cantilever clamping legs and a plurality of normally engaged camming surfaces, said spring cantilever clamping legs being resiliently moved to the cantilever clamping position from an unclamped normal position by the cooperative camming action of said plurality of engaged camming surfaces acting in one direction and by cantilever spring action returning to the unclamped normal position when the cooperative camming action of said camming surfaces acting in said one direction is reversed, said camming surfaces being positioned obliquely relative to said clamping legs and also obliquely relative to the direction of resilient movement of said clamping legs to and from the clamping position;

said fitting being constructed and arranged to have said camming surfaces internally contained so as to be protected against accidental impact damage during normal handling, transport, the process of attachment to at least one cylindrical member, and in its installed position, said fitting comprising:

a nut defining a fitting main body and having a plurality of ends, said nut further having a plurality of interconnecting bore passages therein each having an outer bore end opening through one of said fitting main body ends and each defining at its outer bore end an enlarged recess opening outwardly of said bore through the associated one of said fitting main body ends, each of said recesses being provided with a first one of said camming surfaces defined by an internal thread in axially inwardly spaced relation to the outward opening of said recess;

a plurality of cap bolts, each of said cap bolts having a bore therethrough, a bolt head, a longitudinally segmented annular bolt shank extending axially from said bolt head and provided with a second one of said camming surfaces defined by an interrupted external thread at the remote end of said segmented annular bolt shank from said bolt head, said second camming surface being in axially spaced relation to said bolt head so that said segmented annular bolt shank is fully received in one of said nut recesses when said each one of said cap bolts are threaded into said fitting main body until each of said bolt heads engage said one of said fitting main body ends at one of said recess outer openings to prevent further movement of said bolt heads axially toward its associated one of said recesses and to fully contain said internal and said external thread camming surfaces protectively within said recesses, each of said segmented annular bolt shank comprising shank segments defining said spring cantilever clamping legs;

and means sealing said cap bolt bores in the areas of said cap bolt heads and also sealing said fitting main body recesses axially beyond each of said internal camming surface threads;

said internal and external camming surface threads of each of the associated ones of said recesses and shank segment clamping legs cooperating in camming relation to move said shank segment clamping legs in cantilever fashion inwardly when each of said cap bolts is rotated in a further inwardly threading direction, said shank segment clamping legs then being adapted to clampingly grip a member received in the associated one of said bores in the axial area of the associated one of said external thread camming surfaces.

22. The fitting of claim 21 in which said fitting main body has at least two of said recesses and cap bolts.

23. The fitting of claim 21 in which said fitting main body has at least three of said bores and recesses and cap bolts.

24. The fitting of claim 23 in which said fitting main body has its at least three bores in intersecting relation and interconnected to define a fitting adapted to clampingly grip a number of cylindrical members equal to the number of said bores, said fitting thus being one of a group of fittings comprising fittings known as tees, elbows, X-fittings and oblique fittings.

* * * * *